United States Patent [19]

Frick

[11] Patent Number: 4,527,815
[45] Date of Patent: Jul. 9, 1985

[54] USE OF ELECTROLESS NICKEL COATING TO PREVENT GALLING OF THREADED TUBULAR JOINTS

[75] Inventor: John P. Frick, Dallas, Tex.

[73] Assignee: Mobil Oil Corporation, New York, N.Y.

[21] Appl. No.: 435,784

[22] Filed: Oct. 21, 1982

[51] Int. Cl.³ .............................................. F16L 9/14
[52] U.S. Cl. ...................................... 285/55; 285/94; 285/333; 285/422; 427/305
[58] Field of Search ...................... 285/94, 45, 55, 333, 285/334, 355, 390, 422; 427/304, 305; 411/900, 901; 403/299, 343; 29/458

[56] References Cited

U.S. PATENT DOCUMENTS

| 1,141,151 | 6/1915 | Speller | 285/333 X |
| 3,355,192 | 11/1967 | Kloesel et al. | 285/94 |
| 3,468,563 | 9/1969 | Duret | 285/94 X |
| 4,002,778 | 1/1977 | Bellis et al. | 427/304 X |
| 4,379,575 | 4/1983 | Martin | 285/381 X |

Primary Examiner—Dave W. Arola
Attorney, Agent, or Firm—Alexander J. McKillop; Michael G. Gilman; Charles A. Malone

[57] ABSTRACT

The present invention discloses the use of electroless nickel coatings on oil country tubular goods to eliminate galling of the threads, provide a tortuous path as a sealing surface, and provide porous lubricant reservoirs.

9 Claims, 1 Drawing Figure

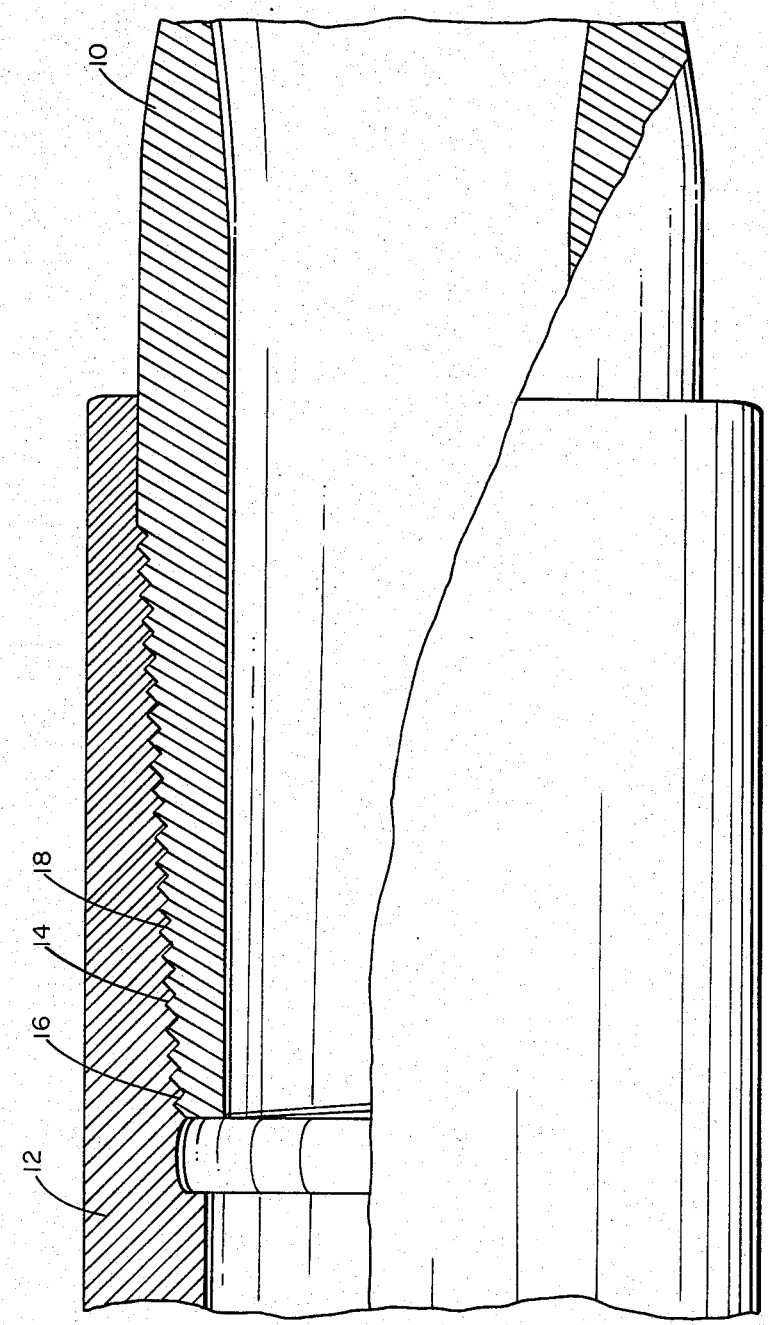

USE OF ELECTROLESS NICKEL COATING TO PREVENT GALLING OF THREADED TUBULAR JOINTS

FIELD OF THE INVENTION AND BACKGROUND OF THE INVENTION

1. Field of the Invention

This invention relates to oil country tubular threaded joints provided with an electroless nickel coating that eliminates gelling of the threads, provides a tortuous path as a sealing surface, and provides porous lubricant reservoirs.

2. Background of the Invention

Galling of casing and tubing threads has been a problem in the oil field for many years. It is particularly pronounced in the softer grades of quenched and tempered pipe. Galling is caused by two metal surfaces coming into "intimate" or "metallurgical" contact. When this happens metal is pressed against metal (without benefit of lubricant, oxide coating, or other protective film) with sufficient force that small areas atomically bond together. This can be viewed as spot welding on an atomic scale. When the metal surfaces are moved the metal is torn apart. Sometimes the rough metal in the torn areas will also damage the metal surfaces.

In order to prevent galling it is necessary to prevent the "intimate" contact of the surfaces.

Research has indicated that soft metals are more prone to galling than hard metals and that similar metal couples are more prone to galling than dissimilar metal couples.

Typical methods in use in the oil and gas industry involves the use of a lubricant which forms a layer between the surfaces. The lubricant is oil or grease. Sometimes particles of soft metals such as copper, lead, zinc, or tin are added. These particles serve two functions. Firstly, they act as a barrier preventing intimate contact of the surfaces. Secondly, under extreme pressure they deform and act as a lubricant between the surfaces.

Other approaches in the prior art have used conversion coating on the metal surfaces in conjunction with lubricants. This conversion coatings are commonly referred to as "phosphate" or "black oxide" coatings or by their proprietary process name, e.g. "Parkerizing". They are characterized by the formation of a chemical compound (usually a phosphate or oxide) on the surface to be protected. During this process a portion of the original metal surface is dissolved. The conversion coatings prevent galling by (1) the interposition of a barrier layer (the oxide or phosphate) between the metal surfaces; (2) creating pockets of lubricant in the coating layer (due to the porous nature of the coating) which provide a more or less constant supply of lubricant to the surfaces under extreme pressure conditions; and (3) the creation of an irregular surface on the metal through the dissolution process.

Another method of preventing galling consists of "surface improvement treatments" of the surfaces to be protected. These treatments may be sandblasting or blasting with glass beads or shot. Liquid and vapor honing are also examples of treatments of this class. These treatments roughen the surface making many small dimples. These dimples serve as a lubricant reservoirs under extreme pressure conditions. A lubricant must of course be provided to fill such reservoirs.

Still a further method of preventing galling consists of applying a coating of soft metal such as tin or zinc to one of the surfaces to be protected. This technique is commonly also used with lubricant. The metal coating acts as a lubricant of last resort under extreme pressure conditions. This method is described in U.S. Pat. No. 1,141,151 to F. N. Speller.

Sealing of casing and tubing connections is a problem in the oil and gas industry. It is difficult to run a string of pipe in a well and have a leak tight system. This is because the reliability of existing connections for leak resistance is not very high and because of the large number of connections which must be made in the string.

One solution for sealing is that used for API 8-round threads. A viscous material (such as API thread dope) is smeared on the threads before the connection is made up. The thread dope acts as a sealant for the joint. This system is not satisfactory at high pressures.

Another solution for sealing is that sometimes used for API buttress threads. The threads are coated with a soft metal such as zinc or tin and this metal coating serves to plug the gaps in the threads which could cause a leak.

A further solution for sealing is to use one or more metal to metal seals in conjuction with a threaded connection. Examples of this approach include Hydril Super EU, CS, and PH 6 connections, Atlas Bradford TC-4S and CQS connections, Mannesmann BDS and TDS connections and the VAM connection. These seals work because they form a tortuous path (on an atomistic scale) through which the gas molecules have difficulty in passing. Still a further solution for sealing is the use of a ring or gasket of elastomeric or thermoplastic material in the body of the threads. An example of this would be the TEFLON ® ring in the Atlas Bradford TC-4S connection.

The present invention provides a method for preventing galling, provides an effective fluid seal, and provides porous lubricant reservoirs by covering one surface with a hard metal coating such as electroless nickle.

SUMMARY OF THE INVENTION

The present invention relates to a method for preventing galling, provide a more effective fluid seal, and provide porous lubricant reservoirs of a threaded oil country tubular connection between the end of a first pipe section and the end of a second pipe section. A hard coating of electroless nickel is applied to the internal threads of the socket of the first pipe or the threads of the end of the second pipe.

BRIEF DESCRIPTION OF THE DRAWING

The attached drawing is a side view partly in central longitudinal section illustrating the threaded connection between the end of a first pipe section and a second pipe section provided with a coating of electroless nickel on the threads of the second pipe section.

DESCRIPTION OF THE PREFERRED EMBODIMENTS

This invention consists of the use of electroless nickel coatings on oil country tubular goods to eliminate galling of the threads, provide a tortuous path as a sealing surface, and provide porous lubricant reservoirs.

Referring to the accompanying drawing, there is shown a threaded joint between tubular pipe ends 10 and 12. Pipe end 10 is tapered and threaded at 14 for engagement with the threaded end 16 of pipe 12. The tubular pipe ends 10 and 12 consist of metal such as stainless steel or carbon steel. The threads 14 of pipe end 10 are provided with a hard coating 18 comprising electroless nickel. Electroless nickel coatings contain phosphorous that increases the hardness of the coating and the common method of applying this coating is naturally porous. The electroless nickel coating is applied by immersing the part to be coated in a hot bath containing an organic nickel compound. The organic compound decomposes and deposits the nickel on the surface to be coated. Such a bath is not dissimilar to those used to apply conversion coatings. Since conversion coatings are currently in wide use in the oil and gas industry this coating could be easily adapted to commercial production. This type of process deposits the coating in a very uniform manner (as opposed to electrolytic processes which tend to apply thicker coatings to the crests of the threads). This uniformity of coatings will result in lower stresses in the connection after makeup, thus improving the performance of the connection.

The electroless nickel coating 18 is harder than the facing metal of threads 16 which prevents galling and protects the surfaces from intimate contact by the interposition of the hard coating. By careful practice in the application of the coating, controlled porosity can be introduced into the coating. This porosity will act as lubricant reservoirs supplying lubricant under extreme pressure conditions.

The hard coating, when pressed against the softer metal will form a tortuous path thereby providing an effective fluid seal.

Alternately, it is to be recognized that the electroless nickel coating may be applied to the internal threads 16 of pipe end 12 rather than threads 14 in the manner as hereinabove described.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in the claims appended immediately hereinafter below.

What is claimed is:

1. A method for preventing galling, providing a more effective fluid seal, and providing porous lubricant reservoirs of a threaded connection between the end of a first pipe section and the end of a second pipe section, said connection consisting of a threaded metal socket on the end of said first pipe section and a threaded metal end on the end of said second pipe section engaged in said socket, comprising:
   (a) depositing a metal conversion coating on the threaded end of said first pipe section which coating is harder than the metal comprising the threaded uncoated end of said second pipe section; and
   (b) connecting said threaded coated end of said first pipe section with the threaded uncoated end of said second pipe section which hard coating on said first section presses against the softer metal of said second section and forms an effective fluid seal.

2. The method of claim 1 wherein said first and second pipe sections consists of stainless steel and the hard metal coating consists of electroless nickel.

3. The method of claim 1 wherein said first and second pipe sections consists of carbon steel and the hard metal coating consists of electroless nickel.

4. A threaded connection between the end of a first pipe section and the end of a second pipe section, comprising a threaded metal socket on said first pipe section, a threaded metal end on said second pipe section to engage in said socket, and a conversion coating of a metal on said threads of one of said pipe sections harder than the metal of the other uncoated pipe section which said metal when threaded and pressed against the softer metal will provide an effective seal.

5. A threaded connection according to claim 4 wherein the first and second pipe sections consist of stainless steel and the hard metal coating consists of electroless nickel.

6. A threaded connection according to claim 5 wherein the first and second pipe sections consist of carbon steel and the hard metal coating consists of electroless nickel.

7. A method for preventing galling, providing a more effective fluid seal, and providing porous lubricant reservoirs of a threaded connection between the end of a first pipe section and the end of a pipe section, said connection consisting of a threaded metal socket on the end of said first pipe section and a threaded metal end on the end of said second pipe section engaged in said socket, comprising:
   (a) depositing a metal conversion coating on the threaded end of said second pipe section which coating is harder than the metal comprising the threaded uncoated end of said first pipe section; and
   (b) connecting said threaded coated end of said second pipe section with the threaded uncoated end of said first pipe section which hard coating on said second section presses against the softer metal of said first section and forms an effective fluid seal.

8. The method as recited in claim 7 wherein said first and second pipe sections consists of stainless steel and the hard metal coating consists of electroless nickel.

9. The method as recited in claim 7 wherein said first and second pipe sections consists of carbon steel and the hard metal coating consists of electroless nickel.

* * * * *